(12) United States Patent
Miyanaga

(10) Patent No.: US 8,974,335 B2
(45) Date of Patent: *Mar. 10, 2015

(54) SILENT CHAIN

(75) Inventor: Syota Miyanaga, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 247 days.

This patent is subject to a terminal disclaimer.

(21) Appl. No.: 13/596,157

(22) Filed: Aug. 28, 2012

(65) Prior Publication Data

US 2013/0059691 A1 Mar. 7, 2013

(30) Foreign Application Priority Data

Sep. 5, 2011 (JP) ................................. 2011-193205

(51) Int. Cl.
*F16G 13/04* (2006.01)
(52) U.S. Cl.
CPC ...................................... *F16G 13/04* (2013.01)
USPC ......................................... 474/214; 474/213
(58) Field of Classification Search
CPC ..................................................... F16G 13/04
USPC .............................. 474/213, 214; 184/5.1, 7.4
See application file for complete search history.

(56) References Cited

U.S. PATENT DOCUMENTS

| | | |
|---|---|---|
| 6,325,735 B1 | 12/2001 | Kanehira |
| 6,383,105 B1 | 5/2002 | Matsuno et al. |
| 7,837,583 B2 | 11/2010 | Tohara |
| 2009/0042683 A1 | 2/2009 | Tohara |
| 2012/0071287 A1* | 3/2012 | Hirai ............................. 474/214 |
| 2012/0157252 A1 | 6/2012 | Yoshida et al. |
| 2012/0196712 A1 | 8/2012 | Miyanaga |

FOREIGN PATENT DOCUMENTS

| | | |
|---|---|---|
| EP | 2133591 A1 | 12/2009 |
| GB | 2487837 A | 8/2012 |
| JP | 2009-41630 A | 2/2009 |
| JP | 2009-299701 A | 12/2009 |
| JP | 2011-52723 A | 3/2011 |
| WO | 2011025759 A2 | 3/2011 |
| WO | WO2011025759 A2 * | 3/2011 .............. F16G 13/04 |

OTHER PUBLICATIONS

Search report by UK Intellectual Property Office, dated Nov. 23, 2012.

* cited by examiner

*Primary Examiner* — William E Dondero
*Assistant Examiner* — Robert T Reese
(74) *Attorney, Agent, or Firm* — Howson & Howson LLP

(57) ABSTRACT

In a silent chain, frictional losses and noise are reduced, and power transmitting efficiency is improved, by making the inner profile of each guide plate sufficiently high in relation to a link plate tooth of a link plate overlapped by each said guide plate that engagement between a sprocket tooth and said link plate tooth takes place before engagement of the last mentioned sprocket tooth with said guide plate, even when the chain moves laterally. The tensile hardness of the guide plates is sufficiently low in relation to the bending rigidity of the connecting pins of the chain to prevent substantial warping of the guide plates as a result of tension acting on the chain. The back surfaces of the guide plates are configured to avoid contact with a sliding contact surface of a chain guide on which a back surfaces of the link plates of said chain can slide.

5 Claims, 9 Drawing Sheets

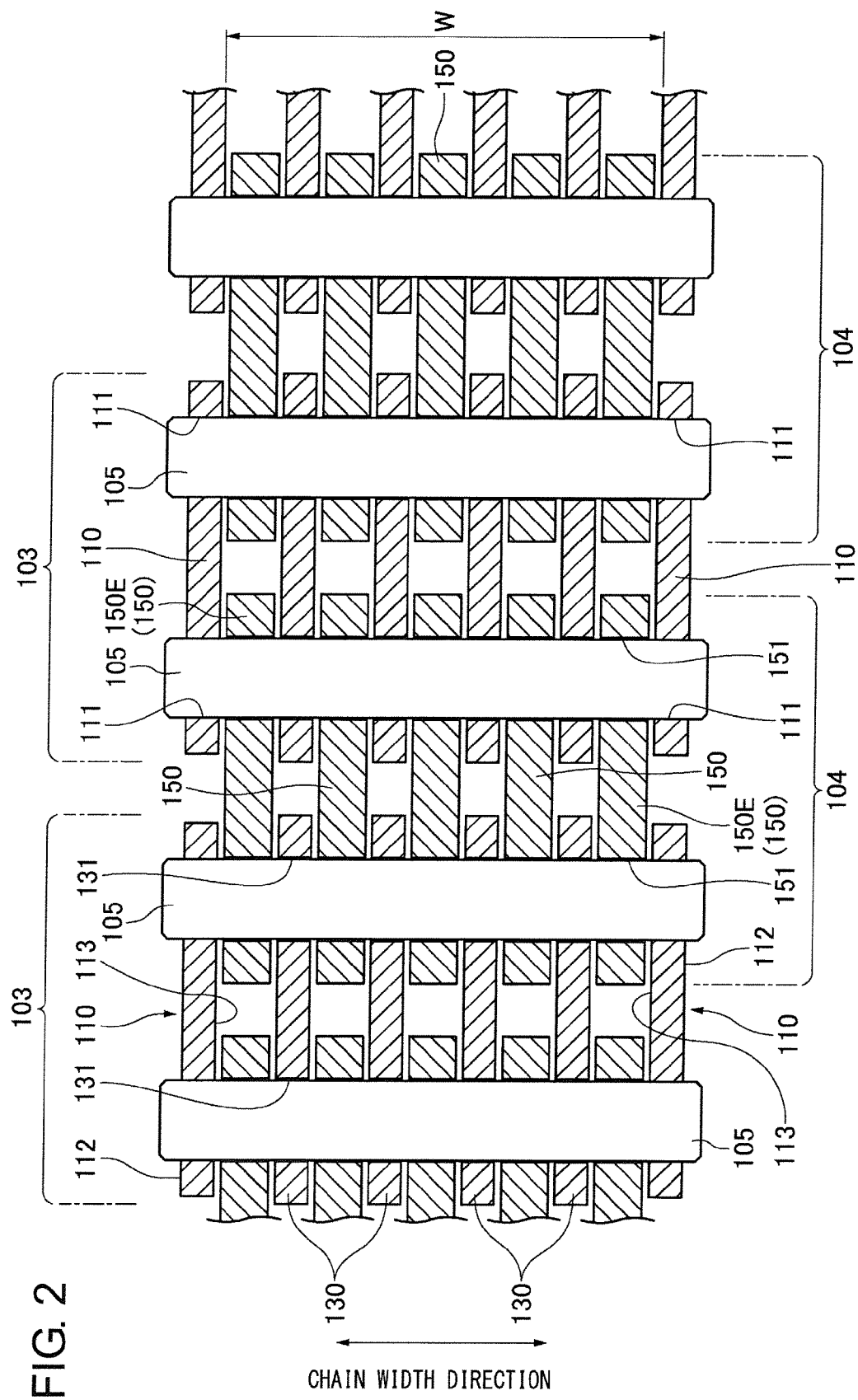

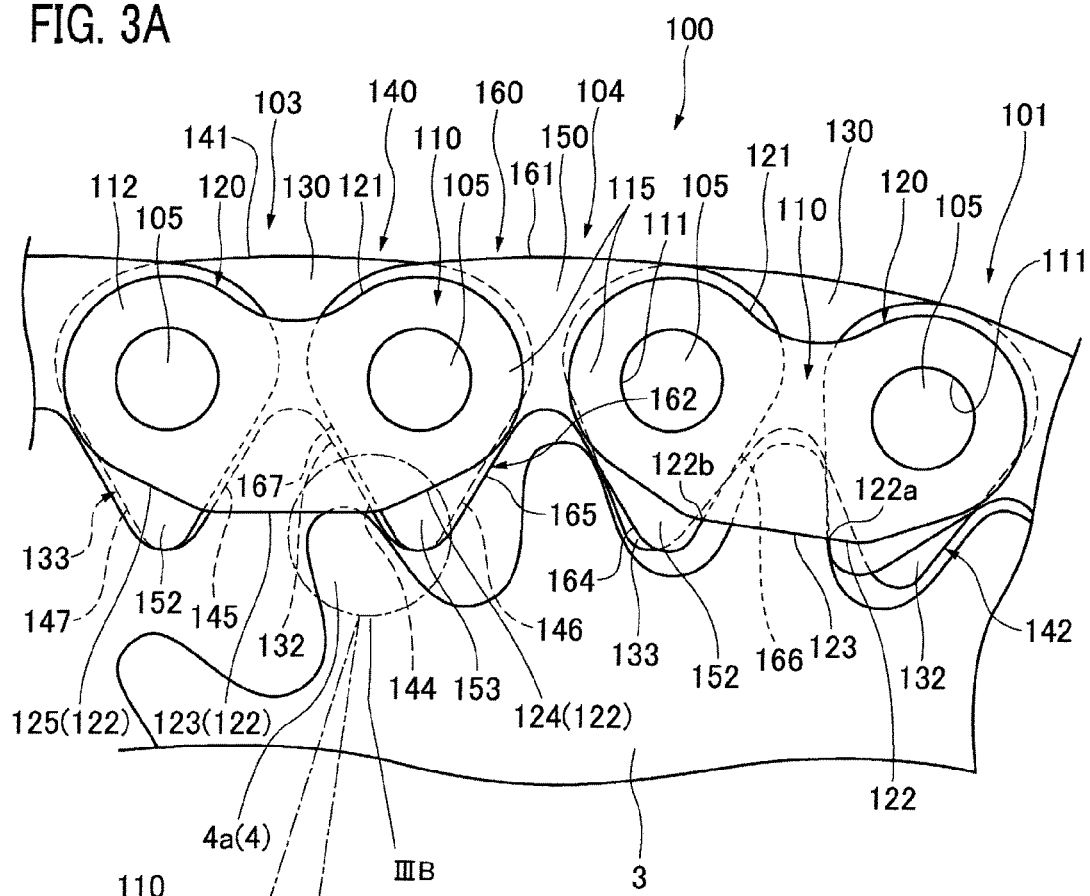
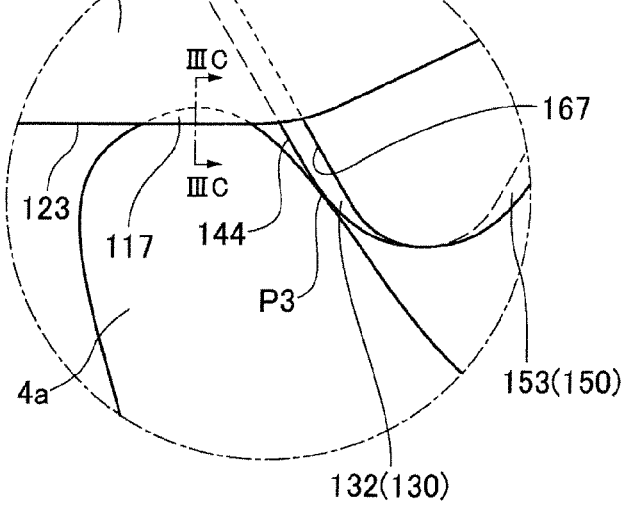
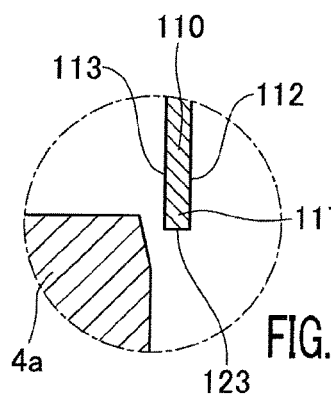

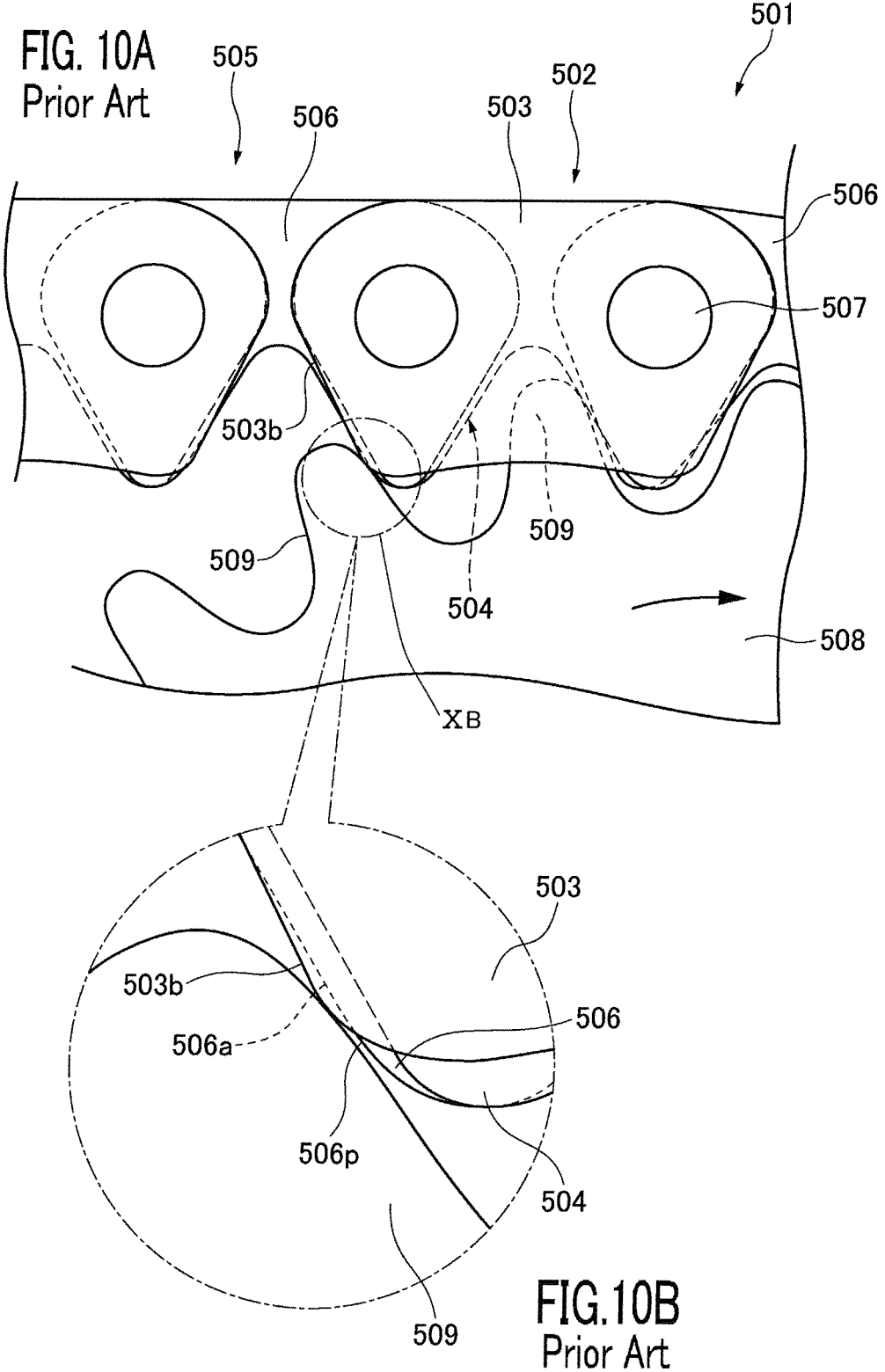

SILENT CHAIN

CROSS REFERENCE TO RELATED APPLICATIONS

This application claims priority on the basis of Japanese Patent Application No. 2011-193205, filed on Sep. 5, 2011. The disclosure of Japanese Patent Application No. 2011-193205 is incorporated by reference.

FIELD OF THE INVENTION

This invention relates to a silent chain having guide plates and link plates that engage with sprockets. The silent chain can be used, for example, to transmit power in automobile engines and industrial machinery.

BACKGROUND OF THE INVENTION

A typical silent chain comprises alternating guide rows and non-guide rows, each comprising a set of link plates. The link plates of the guide rows and the link plates of the non-guide rows are disposed in interleaved relationship.

Each guide row is composed of a pair of spaced, opposed, guide plates and a set of intermediate link plates disposed between the guide plates. The intermediate link plates are engageable with sprockets of a transmission. Each of the non-guide rows is composed of a plurality of inner link plates, which are interleaved with the intermediate link plates of the guide rows and also engageable with the sprockets. Pairs of connecting pins are provided for each pair of guide plates. In the silent chain, the guide rows and non-guide rows are connected in articulating relationship by the connecting pins. A typical silent chain is described in U.S. Pat. No. 6,325,735, granted on Dec. 4, 2001.

In the operation of a silent chain transmission, the condition of the chain changes in various ways. In particular, the chain tends to move laterally, or "swing" in the direction of its width. This movement is sometimes referred to as "lateral swing."

As shown in FIGS. 9A and 9B, a silent chain 501 comprises guide rows 502, each composed of a pair of guide plates 503 and intermediate link plates 504, non-guide rows 505, each composed of a plurality of inner link plates 506, and pairs of connecting pins 507 fixed to the guide plates 503.

When lateral swing occurs, if an inner end face 503a of a guide plate 503 is located in the vicinity of an engagement starting point 504p, at which an inner flank 504a of an intermediate link plate 504 starts to engage a sprocket tooth 509, it is possible for the guide plate 503 to contact the sprocket tooth 509 before the intermediate link plate 504 contacts the sprocket tooth. Furthermore, as shown in FIGS. 10A and 10B, when a non-guide row 505 starts to engage the driving sprocket 508, lateral swing can result in contact between an end surface 503b of the guide plate 503 and a sprocket tooth 509 before the inner link plate 506 contacts the sprocket tooth.

Ordinarily, the sprocket tooth 509 starts to engage the intermediate link plates 504 and the inner link plates 506 without contacting a guide plate 503. However, if the sprocket tooth 509 contacts the guide plate 503 before it contacts an intermediate or inner link plate, frictional loss and noise are generated due to contact between the guide plate 503 and the sprocket tooth 509, causing deterioration in the performance of the silent chain.

Furthermore, as shown in FIG. 11, when tension in the silent chain 501 increases, the inner link plates 506 can bend the connecting pins 507, which are held by the pair of guide plates 503 one of which is shown in FIG. 11. Bending of the connecting pins 507 can occur when the tensile hardness of the guide plate 503 between the pair of connecting pins 507 exceeds the bending rigidity of the connecting pin 507.

Bending of the connecting pins 507 causes the guide plates 503 to warp so that they become convex toward the intermediate link plates 504 in the chain width direction. Due to the warp, an inner link plate 506 contacts an inside surface 503a of the guide plate 503, causing still more frictional loss when a non-guide row 505 turns relative to an adjacent guide row 502 about the centerline of a connecting pin 507 as the intermediate link plates 504 or the inner link plates 506 start to engage a sprocket.

As shown in FIGS. 9A and 9B, if the back surfaces 503b, 504b and 506b of the guide plate 503, the intermediate link plate 504 and the inner link plate 506 are co-planar, the contact area of the back of the chain with the sliding-contact surface of a chain guide (not shown) increases, resulting in an additional frictional loss.

The several frictional losses described above reduce the power-transmitting efficiency silent chain 501. Accordingly, there is a need for a silent chain having a plate configuration that reduces frictional losses and improves power transmitting efficiency and noise performance.

SUMMARY OF THE INVENTION

The silent chain according to the invention is a chain elongated along a direction of chain travel and comprises alternating guide rows and non-guide rows, each row comprising a set of link plates. Each of the guide rows is composed of a pair of guide plates in spaced, opposed relationship, and a plurality of intermediate link plates disposed between the guide plates. Each of the non-guide rows is composed of a plurality of inner link plates. The intermediate link plates of each guide row are interleaved with inner link plates of two adjacent non-guide rows. Two spaced connecting pins are connected to the guide plates of each pair of guide plates, and each of the connecting pins articulably connects a guide row with a non-guide row whereby the guide rows and non-guide rows are disposed in alternating relationship forming a chain.

The intermediate link plates and the inner link plates are formed with teeth for engagement with the teeth of a sprocket, and the link plates are rotatable about center lines of the connecting pins.

A characterizing feature of the invention is the fact that the inner profile of each of the guide plates is sufficiently high in relation to a link plate tooth of a link plate that is overlapped by each said guide plate that the engagement between a sprocket tooth and said link plate tooth takes place before engagement of the last mentioned sprocket tooth with said guide plate can take place even when the silent chain moves laterally. In addition, the tensile hardness of the guide plates is sufficiently low in relation to the bending rigidity of the connecting pins to prevent substantial warping of the guide plates as a result of tension acting on the chain. Moreover the back surface of each guide plate is configured to avoid contact with a sliding contact surface of a chain guide on which a back surface of a link plate of said chain can slide.

With this arrangement, even when the silent chain is moved laterally relative to the sprockets, because the engagement starting point of one link plate of the silent chain is at a position where the guide plate does not contact the sprocket tooth before an adjacent link plate starts to engage the sprocket tooth, it is possible to prevent the guide plate from contacting the sprocket teeth until the sprocket teeth start to engage the inner flanks of the link plates. Accordingly, it is possible to achieve the same engagement starting performance when the chain is moved laterally as when the chain is in its normal position. Frictional losses and noise which would otherwise be caused by contact between the guide plate and a sprocket tooth can be avoided and improved power transmitting efficiency can be achieved.

In addition, because the tensile hardness of the guide plates is less the bending rigidity of the connecting pins, it is possible to prevent the connecting pins from bending when the chain is under tension, and to prevent the guide plates from warping due to the bending of the connecting pins. Accordingly, it is possible to reduce frictional contact between the guide plates and the adjacent inner link plates, and thereby achieve a still further reduction in frictional loss.

A further reduction in frictional losses is achieved by configuring the back surface of the guide plates to avoid contact with the sliding contact surface of a chain guide.

Thus the invention achieves reduction of frictional losses in three ways: by avoiding premature contact between a sprocket tooth and a guide plate, by avoiding warping of the guide plates due to chain tension, and by reducing the contact area between the back of the chain and the sliding contact surface of a chain guide.

Another aspect of the invention is the formation of the back surfaces of the guide plates so that they have a pair of spaced portions connected by a concave portion. The spaced portions have a back surface height greater than the back surface height of the concave portion, and the back surface heights of the spaced portions are lower than the back surface heights of the intermediate link plates between the guide plates and lower than the back surface height of the inner link plates of the non-guide rows.

The concave configuration of the backs of the guide plates reduces the tensile hardness of the guide plate, making it possible to avoid substantial warping of the guide plates as a result of chain tension. In addition avoiding contact between the back surfaces of the guide plates and the chain guide reduces frictional loss.

According to still another aspect of the invention, the back surfaces of the link plates have a convex arcuate shape along the direction of travel of the chain. With this arrangement, it becomes possible to reduce the contact area of the back surfaces with the sliding contact surface of a chain guide and thereby achieve a still greater reduction in the overall frictional loss in the operation of a silent chain transmission.

In still another aspect of the invention, at least some of the link plates have back surfaces with convex arcuate shapes in section planes transverse to the direction of travel of the chain. Accordingly, it is possible to achieve a still further reduction in the overall frictional loss of a silent chain transmission.

In another aspect of the invention, in at least one set of the rows from a set consisting of the guide rows of the chain and a set consisting of the non-guide rows of the chain, at least one link plate has a back surface configured to avoid contact with a sliding-contact surface when said sliding contact surface is in sliding contact with backs of other link plates in the same row.

With this arrangement, it is possible to reduce still further the contact area between the chain and the sliding contact surface of a guide, and thereby achieve a still greater reduction in the overall frictional loss in the operation of a silent chain transmission.

BRIEF DESCRIPTION OF DRAWINGS

FIG. 2 is a sectional a part of the silent chain shown in FIG. 1 on a plane in which the center lines of the connecting pins;

FIG. 3A is a side elevational of a part of the silent chain transmission, showing the engagement of a guide row of the silent chain in FIG. 1 with a sprocket;

FIG. 3B is an enlargement of a part of the transmission of FIG. 3A outlined by a broken line circle in FIG. 3A;

FIG. 3C is a sectional view taken on section plane IIIC-IIIC in FIG. 3B;

FIG. 10A is a sectional view showing engagement of a non-guide row of a conventional chain with a sprocket;

FIG. 10B is an enlarged view of a part of the silent chain transmission shown in FIG. 10A outlined by a broken line circle in FIG. 10A.

DETAILED DESCRIPTION OF THE PREFERRED EMBODIMENTS

Figure 1:
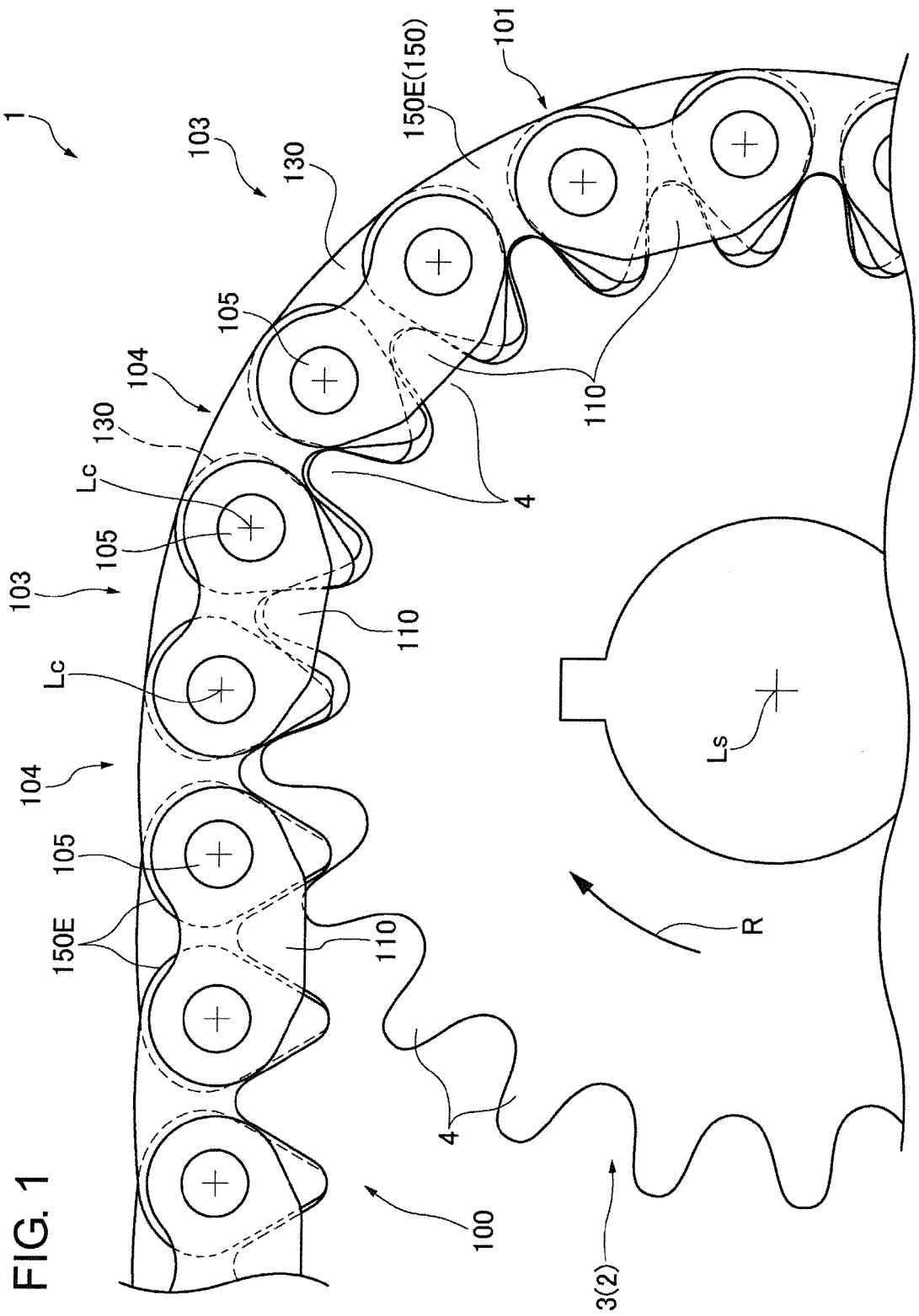
FIG. 1 is a side elevational view of part of a silent chain transmission incorporating a silent chain in accordance with the invention.

As shown in FIGS. 1 and 2, a silent chain 100 is incorporated into a silent chain transmission 1, which comprises a plurality of sprockets with which the chain is engaged, one such sprocket being shown in FIG. 1. The transmission also includes, a chain guide 5 (FIG. 5) on which the silent chain slides.

The silent chain 100 is composed of a plurality of guide rows 103, a plurality of non-guide rows 104, and a plurality of connecting pins 105 that connect the guide rows 103 with the non-guide rows 104 in alternation relationship to form an endless chain.

The sprocket mechanism is composed of a plurality of sprockets, i.e., one or more driving sprockets 3 and one or more driven sprocket 2, each having a plurality of sprocket teeth 4.

FIG. 1 shows a driving sprocket 3 that rotates in a direction R about an axis Ls.

Figure 5:
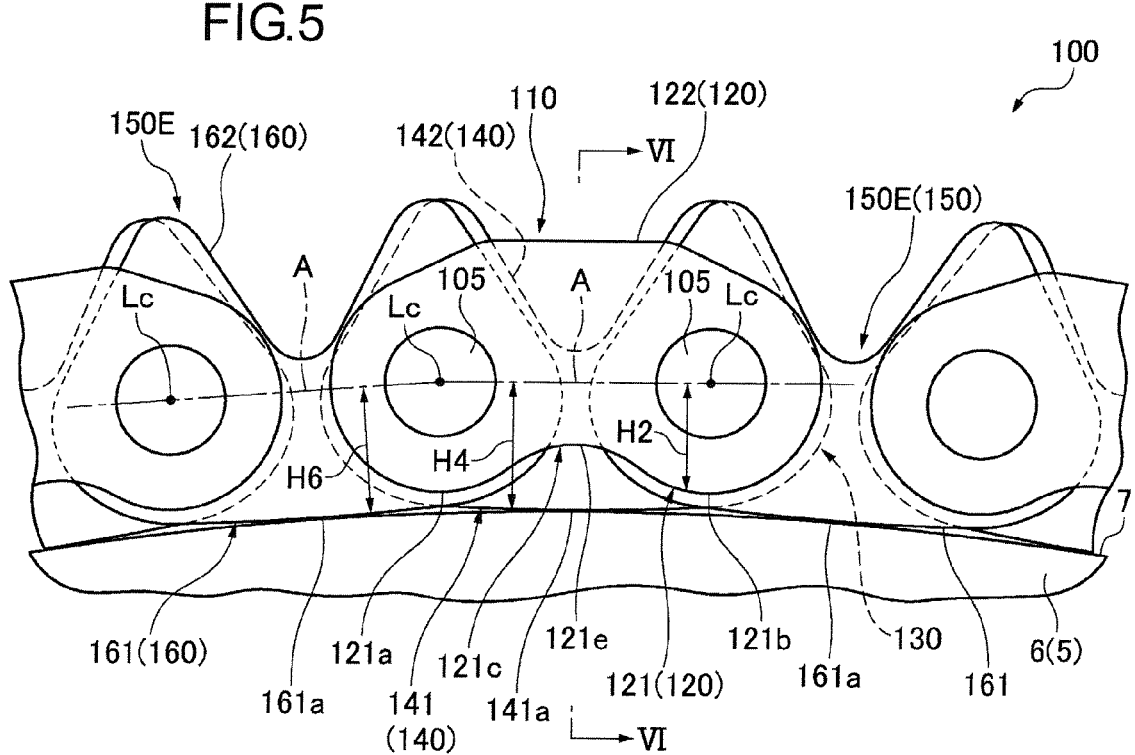
FIG. 5 is a side view showing a part of the silent chain of FIG. 1 in sliding contact with a chain guide.
Figure 6:
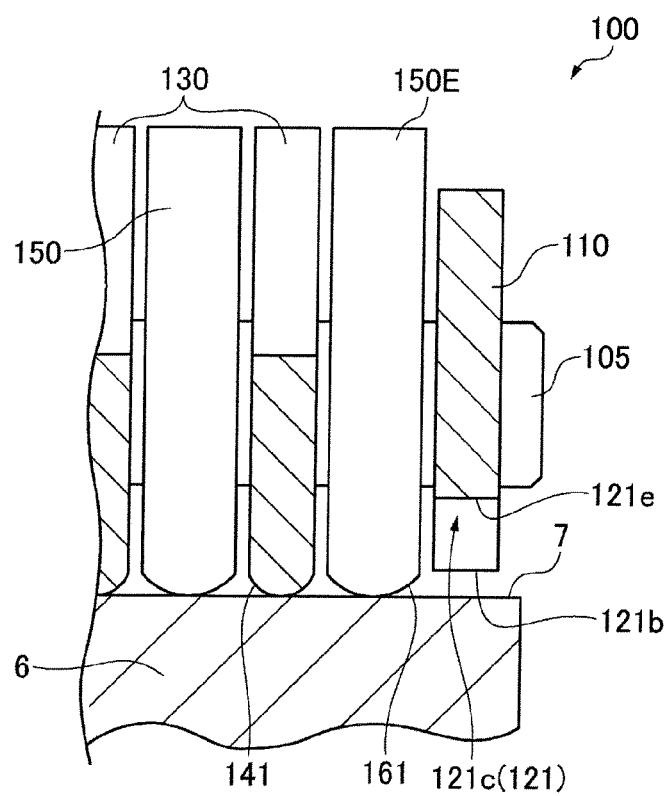
FIG. 6 is a sectional view taken on section plane VI-VI in FIG. 5.

FIGS. 5 and 6 shows a chain guide 6 which can be either a tensioner lever that applies tension to the chain, or a stationary chain guide. In either case, the chain guide has a sliding-contact surface 7 on which the back of the traveling silent chain 100 slides As shown in FIGS. 1 and 2, the traveling direction is the direction in which the silent chain 100 moves, and the chain width direction (see FIG. 2) is a direction parallel to the centerline Lc of the connecting pins about which a non-guide row 104 bends relative to a guide row 103. These centerline Lc are parallel to the axis of rotation Ls of the sprocket 3. The front and back directions are respectively the direction of chain travel and the direction opposite to the direction of chain travel. A side view is a view from a direction in parallel with the centerline Lc and the sprocket axis Ls, and the radial direction is a direction perpendicular the axis Ls of the sprocket 3.

A lateral swing is condition in which the traveling silent chain 100 swings in the chain width direction, and also includes a condition in which the silent chain 100 is slanted in the chain width direction.

The silent chain 100 has guide rows 103, each comprising a pair of guide plates 110 and a number of intermediate link plates 130. The chain also has non-guide rows 104, each having a number of inner link plates 150 exceeding by one the number of intermediate link plates in a guide row. Each guide row comprises a pairs of connecting pins 105 each pin being fixed to both of the opposite guide plates 110. The pins are separated from each other in the direction of chain travel. Each pin connect the intermediate link plates 130 of a guide row with the inner link plates 150 of an adjacent non-guide row in interleaved relationship, allowing both sets of link plates to rotate about the center line Lc of the pin.

In FIGS. 2 and 6, gaps between the guide plates 110, the intermediate link plates 130 and the inner link plates 150 and gaps between the connecting pins 150 and pin insertion holes 131 and 151 are exaggerated.

A plurality of intermediate link plates 130 is disposed between the pair of guide plates 110 in the chain width direction in each guide row 103. Each guide plate 110 is provided with pin holding holes 111 at positions separated from each other in the direction of chain travel, i.e., in the front-back direction.

The ends of each of the connecting pins 105 are fixed in the holding holes of the guide plates 110 by suitable means such as press-fitting or caulking.

The inner link plates 150 in each non-guide row 104 are disposed in interleaved relationship with the intermediate link plates and guide plates of each of two adjacent guide rows. As shown in FIG. 2, inner link plates 150E, located at ends of each non-guide row 104 are disposed next to guide plates 110 in adjacent guide rows.

As shown in FIGS. 3A, 3B, 4A and 4B, the intermediate link plate 130 and the inner link plate 150 respectively have a pair of link teeth 132 and 133 and 152 and 153 that project radially inward for engagement with sprocket teeth 4. Teeth 132 and 133 are front and rear link teeth respectively, and teeth 152 and 153 are front and rear link teeth respectively.

The respective link teeth 132 and 133 have inner flanks 144 and 145 and outer flanks 146 and 147, which can contact sprocket teeth 4. The respective link teeth 152 and 153 likewise have inner flanks 164 and 165 and outer flanks 166 and 167 which can contact sprocket teeth 4.

The pairs of the inner flanks 144 and 145 and 164 and 165 of the respective link plates 130 and 150 are front inner flanks (144 and 164) and rear inner flanks (144 and 155), and the pairs of the outer flanks 146 and 147 and 166 and 167 are front outer flanks (146 and 166) and rear outer flanks (147 and 167).

The intermediate link plates 130 and the inner link plates 150 are provided respectively with pin insertion holes 131 and 151 through which the connecting pins 105 are inserted as shown in FIG. 2.

Each pair of connecting pins 105 held by a pair of guide plates 110 in a guide row 103 connects a link plate group composed of the intermediate link plates 130 and the inner link plates 150 of two adjacent non-guide rows, allowing the non-guide rows to articulate with respect to the guide rows about connecting pin centerline Lc. Although the connecting pins 105 shown in the drawings are round pins, the connecting pins can be rocker pins, each composed of two elements having mutually engaging cylindrical surfaces that roll on each other.

As shown in FIGS. 3A through 5, the profiles of the link plates 130 and 150, comprise inner profile surfaces 142 and 162 on the side where the sprocket teeth 4 are located and outer profile surfaces, i.e., back surfaces, 141 and 161, located on a side opposite from the inner profile surfaces 142 and 162. The pin reference plane A passing through the center lines Lc of the pins marks the border between the inner and outer profile surfaces. The side where the sprocket tooth 4 is located is radially inward of the portion 101 of the chain wrapped onto the sprocket 3, and the side opposite from the inner profile surfaces is outward in the radial direction. The inner profile surfaces 142 and 162 have flanks 144 through 147 (FIG. 3A) and 164 through 167 (FIG. 4A).

With reference to FIGS. 3A and 5, and as shown in FIG. 5 in particular, the back surfaces 141 and 161 of the respective link plates 130 and 150 are convex, having arc-shaped intermediate parts 141a and 161a, where the back surface heights H4 and H6 are maximum.

The back surface heights H4 and H6 of the link plates and the back surface height H2 of the guide plates are distances respectively from the pin reference plane A to the back surfaces of the plates. As shown in FIG. 6, the respective back surfaces 141 and 161 that slide on surface 7 of the guide are convex, arc-shaped, surfaces in a section plane orthogonal to the pin reference plane A. The "arc-shaped" surfaces 121 and 141 can be in the form of an arc having a single radius of curvature, a curve composed of a plurality of arcs having different radii of curvature that merge together smoothly, or an approximated arc.

As shown in FIGS. 3A, 3B, 4A and 4B, when the silent chain 100 travels normally, and the guide row 103 and the non-guide row 104 engage the sprocket teeth 4, the front inner flanks 144 and 164 of the respective link plates 130 and 150 start to engage a sprocket tooth 4. The engagement point moves inwardly along the sprocket tooth 4 as the engagement advances, and the engagement points in the respective link plates 130 and 150 shift from the inner flanks 144 and 164 to the outer flanks 146 and 147 and 166 and 167. When the link plate is fully engaged with the sprocket, both outer flanks 146 and 147 of the intermediate link plates 130 of the guide row contact a sprocket tooth 4 and both outer flanks 166 and 167 of the inner link plates of the non-guide row contact a sprocket tooth, so that the link plates become seated on the sprocket. Therefore, the silent chain 100 is a referred to as an inner flank-engaging, outer flank-seating type chain.

The ordinary position of the chain is a position in which the sprocket tooth 4 is located within the span W (FIG. 2) between the guide plates 110 of guide row 103. Thus neither of the guide plates 110 overlaps the sprocket tooth in the chain width direction. However, when the silent chain 100 swings laterally, a sprocket tooth may not be within the span W between the guide plates 110.

Figure 4A:
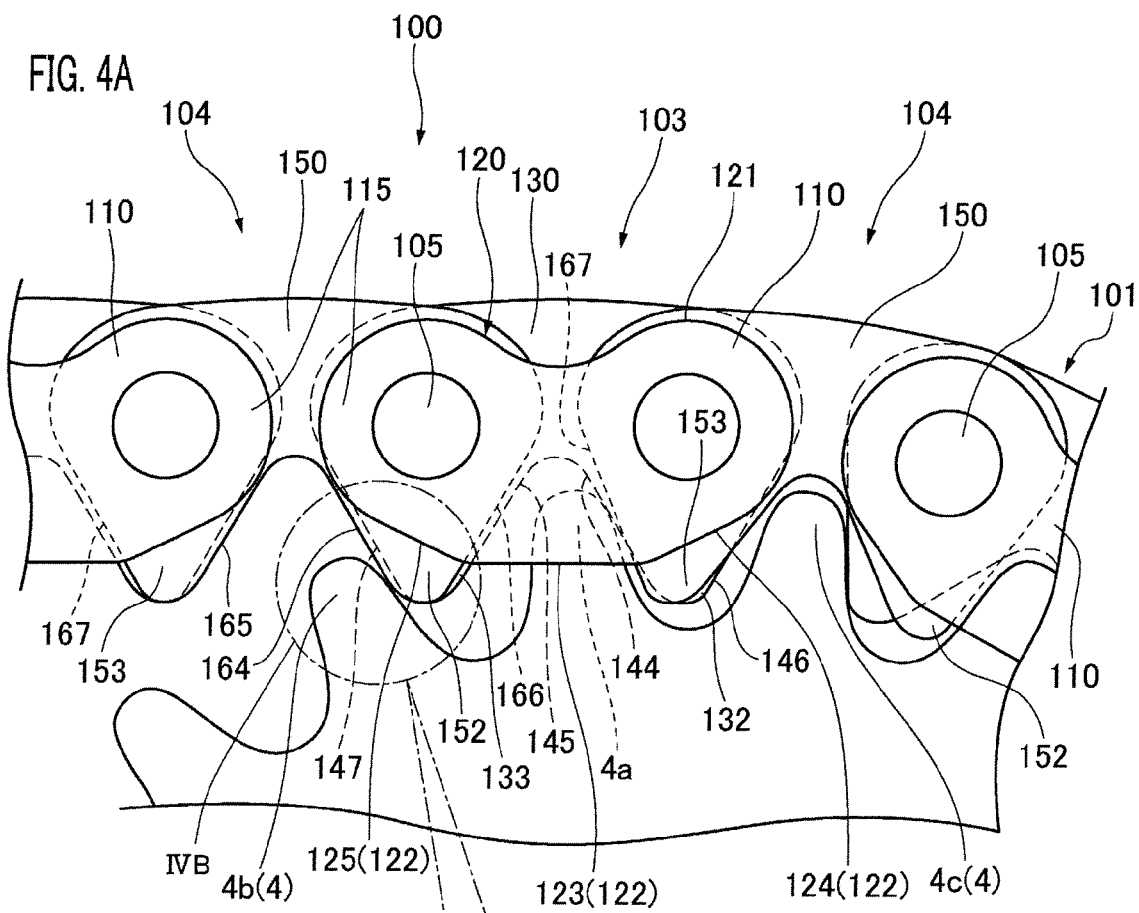
FIG. 4A is a side elevational view of a part of the silent chain transmission, showing the engagement of a non-guide row of the silent chain in FIG. 1 with a sprocket

As shown in FIG. 2, the respective guide plates 110 have an outer side surface 112 and an inner side surface 113. As shown in FIGS. 3A and 4A, the guide plate 110 has an inner profile surface 122 on the side where the sprocket tooth 4 is located and an outer profile surface, i.e., a back surfaces 121, located on the side opposite from the inner profile surface 122. The portion 115 which has a maximum dimension in the direction of chain travel, constitutes the border between the inner and outer profile surfaces of the guide plate.

The inner profile surface 122 of the guide plate 110 has an inner end surface 123 having a portion located innermost in the radial direction, and a pair of inner side end surfaces 124 and 125 each extending from the inner end surface 123 to a maximum width portion 115.

When seen from the side, the inner end surface 123 intersects the inner flanks 144 and 145 of an intermediate link plate 130 at locations near the ends of surface 123, and the inner end surface 123 is located radially inward in the radial direction of inner side end surfaces 124 and 125. The straight inner side end surfaces 124 and 125 are front and rear inner side end surfaces respectively.

As shown in FIG. 3B, the inner end surface 123 is connected to front inner side end surface 124 by an arc-shaped connecting part. The rear inner side end surface 125 is similarly connected to the inner end surface 123 by an arc-shaped connecting part. The respective inner side end surfaces 124 and 125 can otherwise be straight. This shape of the guide plate 110 makes it possible to form the guide plate easily and to enhance its bending rigidity in the chain width direction even when the back surface 121 is concave. Thus the guide plate can be made more rigid and resistant to bending than a guide plate in which the inner profile surface has one or more concave portions. Consequently it is possible to prevent the guide plate 110 from warping due to chain tension acting on the guide plate through a connecting pin as in the case of guide plate 503 in FIG. 11.

As shown in FIGS. 5 and 6, the back surface 121 of the guide plate 110 has an arc-shaped concave portion 121c formed so that the back surface has two parts 121a and 121b where the back surface height H2 is maximum. Although the back surface heights H2 of parts 121a and 121b are the same in the embodiment described, they can be different. The arc-shape concave portion 121c has a maximum depth at 121e where the back surface height H2 is minimum. The maximum depth is at a location midway between the locations of the connecting pins 105. The concave portion 121c is located radially inward relative to parts 121a and 121b.

Figure 11:
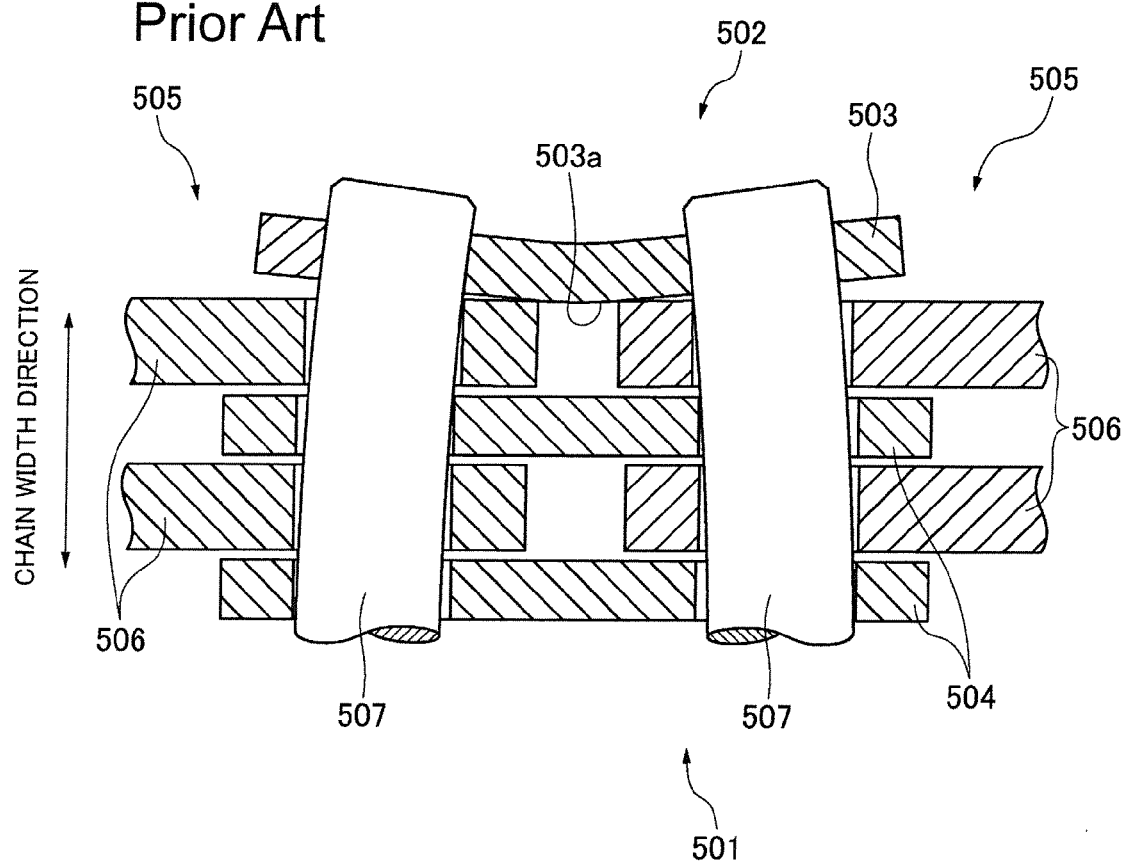
FIG. 11 is a sectional view of part of a conventional the silent chain as shown in FIG. 9A, taken on a plane in which the centerline of the connecting pins lie.

The tensile hardness of the guide plate 110 having the concave portion 121c formed as described above is lower than that of a guide plate having no concave portion, and selected so that it is to be smaller than the bending rigidity of the connecting pin 105. Therefore, due to the ductility of the guide plates and the rigidity of the connecting pins, a force exerted by the link plates on the connecting pins due to excessive chain tension tends to stretch the guide plates instead of bend the connecting pins. Consequently, warping of the guide plates as depicted in FIG. 11 can be suppressed, and frictional loss caused by contact of the inner side surface 113 of the guide plates with the endmost inner link plates of the guide rows can be avoided or at least significantly reduced.

As shown in FIG. 5, the back surface height H2 of the back surface 121, including that of portions 121a and 121b, is less than the back surface heights H4 and H6 of the back surfaces 141 and 161 of the respective link plates 130 and 150 within the range where the back surface 121 of the guide plate 110 overlaps the link plates 130 and 150 in the direction of chain travel.

Because of its limited back surface height H2, the guide plate 110 is prevented from contacting the sliding-contact surface 7 of the guide even when the back surfaces 141 and 161 of the respective link plates 130 and 150 are in sliding contact with guide surface 7 while the chain is in a slanted contact condition. Accordingly a further reduction in frictional loss can be achieved.

When the silent chain 100 is driven by the sprocket 3 while in a lateral swinging condition, engagement starting points P3 and P5 of the respective front inner flanks 144 and 164 of the intermediate and inner link plates 130 and 150 with the sprocket tooth 4, are at positions such that the guide plate 110 is prevented from contacting the sprocket tooth 4 before the front inner flanks 144 and 164 of the respective link plates 130 and 150 start to engage the sprocket tooth 4. Therefore, contact takes place in the same manner as when the silent chain 100 is located at its ordinary position.

Therefore, when the intermediate and inner link plates 130 and 150 start to engage the sprocket tooth 4, the intermediate and inner link plates 130 and 150 always contact the sprocket tooth 4 before the sprocket tooth can contact the guide plate 110.

Specifically, as shown in FIG. 3B, the guide plate 110 is configured so that, even when the chain is in a laterally swinging condition, neither the inner end surface 123 nor either of the inner side end surfaces 124 and 125 can engage the sprocket tooth 4a before the front inner flank surface 144 of the intermediate link plate 130 starts to engage the sprocket tooth 4a.

Therefore, the entire guide plate 110, including the inner end surface 123, is located radially outward from the engagement starting point P3 before the front inner flank surface 144 starts to engage the sprocket 3.

As shown in FIGS. 3B and 3C, when the guide plate 110 has an overlapping portion 117 that overlaps the sprocket tooth 4 when seen from the side, the inner end surface 123 is configured so that the sprocket tooth 4 is located within the span W (FIG. 5) in the overlapping portion 117 in order to avoid contact between the inner end surface 123 and the sprocket tooth 4a before the front inner flank surface 144 starts to engage the sprocket tooth 4a.

In another example, the guide plate 110 can be configured so that no part of the guide plate overlaps the sprocket tooth 4 when seen from the side before the intermediate link plate 130 starts to engage with the sprocket tooth 4.

Figure 4B:
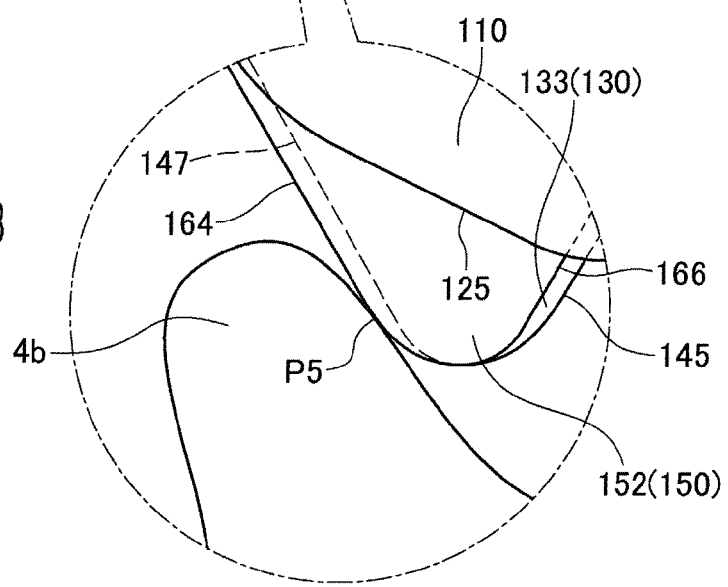
FIG. 4B is an enlargement of a part of the transmission of FIG. 4A outlined by a broken line circle in FIG. 4A.

As shown in FIGS. 4A and 4B, the guide plate 110 is configured to prevent the inner end surface 123 and the both inner side end surfaces 124 and 125 from contacting the sprocket tooth 4 before the front inner flank surface 164 of the inner link plate 150 starts to engage the sprocket tooth 4 when the chain is in the lateral swinging condition. Here, the entire inner profile surface 122, including the rear inner side end surface 125, is located radially outwardly from the engagement starting point P5 before the front inner flank surface 144 starts to engage the sprocket tooth 4, and the no part of the guide plate 110 overlaps the sprocket tooth 4.

The guide plate 110 is configured to avoid contact between the inner profile surface 122 of the guide plate 110 and the sprocket tooth 4b, or so that the guide plate 110 does not overlap the sprocket tooth 4 when seen from the side, throughout the interval from the start of the engagement of the front inner flank surface 144 of the inner link plate 150 with the sprocket tooth 4 until the both outer flanks 146 and 147 of the intermediate link plate 130 located ahead of the inner link plate 150 seat on the sprocket 3 by contact respectively with sprocket tooth 4c ahead of the sprocket tooth 4a and sprocket tooth 4b.

Accordingly, the rear inner side end surface 125 of the guide plate is configured so that it is prevented from contacting the sprocket tooth 4 or so that the rear inner side end surface 125 does not overlap the sprocket tooth 4 when seen from the side, throughout the interval from the start of engagement of the inner link plate 150 with the sprocket tooth 4 until the intermediate link plate 130 located ahead of the inner link plate 150 seats on the sprocket 3.

The positions of the engagement starting points P3 and P5 described above and the configuration of the guide plate 110 with respect to the sprocket tooth 4 described above prevent the guide plate 110 from contacting the sprocket tooth 4 before the intermediate and inner link plates 130 and 150 contact even when the traveling silent chain 100 is operated while in the lateral swing condition.

With the configuration described above it is possible, even when the chain is in a laterally swinging condition, to maintain normal engagement wherein the link plates 130 and 150 of the silent chain 100 first contact the sprocket tooth 4 in the same manner in which they contact the sprocket tooth when the silent chain is traveling in its normal position. Because it is possible to prevent the frictional loss and noise otherwise caused by the contact of the guide plate 110 and the sprocket tooth 4, improve power transmitting efficiency and noise performance can be realized.

Because the inner profile surface 122 is located radially outward relative to the engagement starting points P3 and P5, it is possible to downsize the guide plate 110 in the radial direction and to reduce the weight of the guide plate. Furthermore, because the guide plate 110 is configured to prevent the rear inner side end surface 125 of the guide plate 110 from contacting the sprocket tooth 4 from the start of engagement of the inner link plate 150 with the sprocket until the intermediate link plate 130 seats on the sprocket, it is possible to downsize the guide plate 110 still further by reducing its radial dimensions.

Because the tensile hardness of the guide plate 110 is smaller than the bending rigidity of the connecting pins 105 it is possible to suppress warping of the guide plates due to bending of the connecting pins. Suppression of bending of the guide plates, in turn reduces the frictional loss caused by excessive frictional contact between the guide plates and adjacent outermost intermediate link plates.

A further reduction of frictional loss is realized by configuring the back surfaces 121 of the guide plates so that they are prevented from contacting the sliding contact surface of a chain guide on which the backs of the intermediate and inner link plates slide.

The concave configuration of the back surface of the guide plate 110 also reduces the tensile hardness of the guide plate, reducing the tendency of the connecting pins to bend and cause warping of the guide plate as a result of tension on the chain The convex, arc-shaped configurations of the backs 141 and 161 of the respective link plates reduce the contact area between the chain and the sliding-contact surface of the chain guide, further reducing frictional loss. The convex, arc-shaped, configurations of the backs 141 and 161, while advantageous, are of course optional. Many advantages of the invention can be realized in a chain the link plates of which do not have convex backs.

Figure 7:
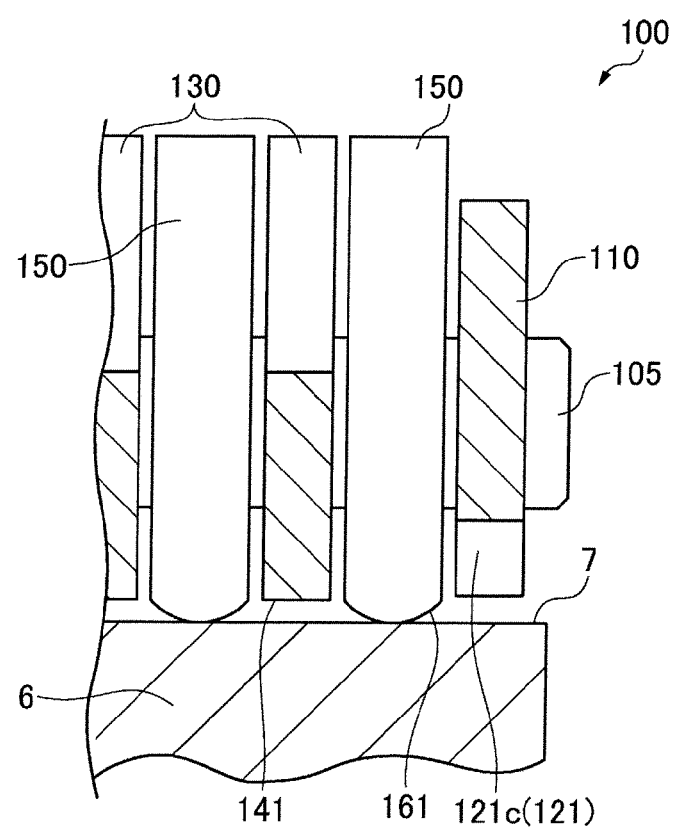
FIG. 7 is a sectional view corresponding to FIG. 6 but showing a first modification of the invention.

In a modification shown in FIG. 7, an inner link plate 150 can be a sliding-contact link plate the back surface 161 of which has an arcuate shape in the direction of chain travel and an arc-shaped transverse section in the direction of the width of the chain. The intermediate link plates 130 in the guide rows, and, optionally, some of the other inner link plates 150 in the non-guide rows, can be configured to avoid contact with the sliding contact surface of a guide.

Figure 8:
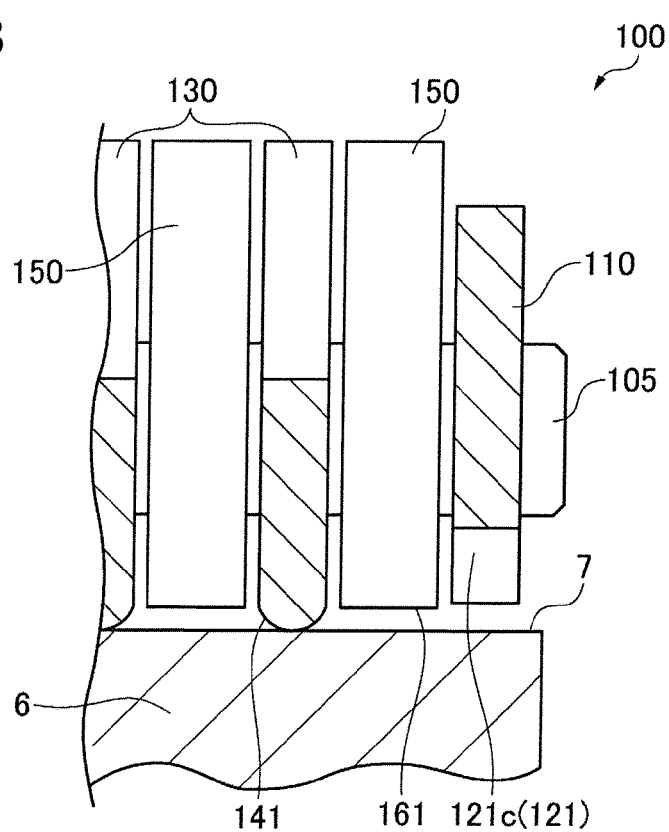
FIG. 8 is another sectional view corresponding to FIG. 6 but showing another modification of the invention.
Figure 9A:
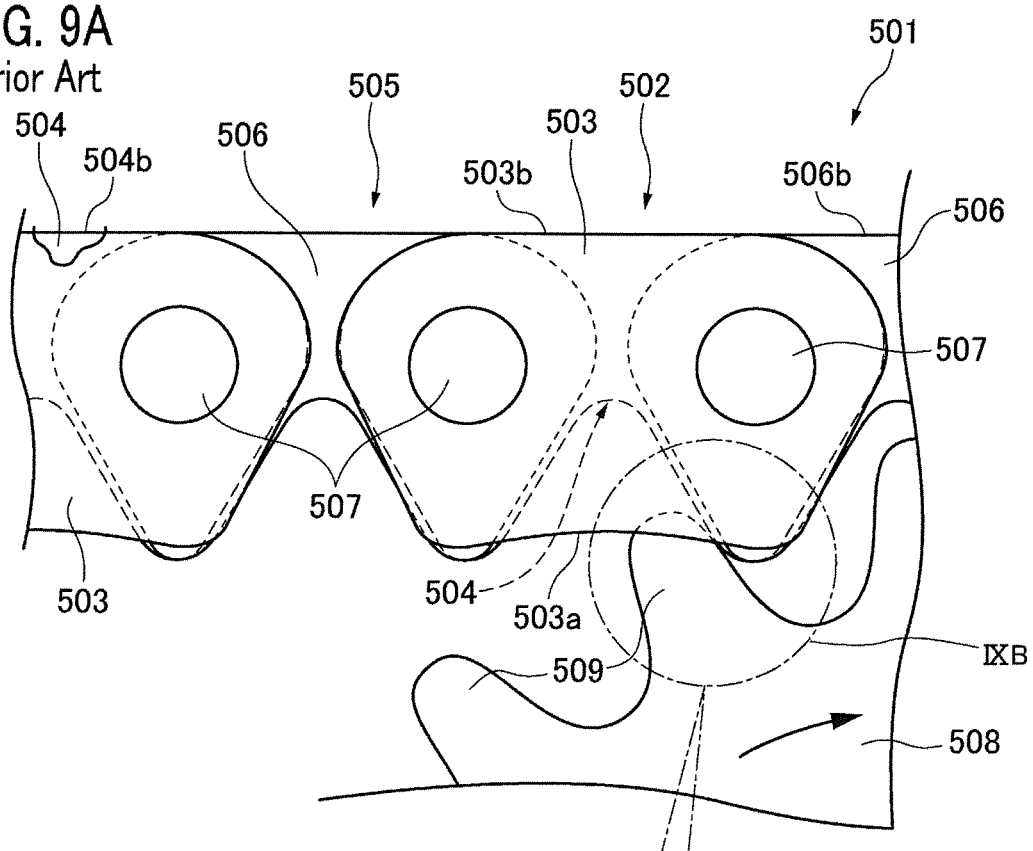
FIG. 9A is a sectional view showing engagement of a guide row of a conventional chain with a sprocket.
Figure 9B:
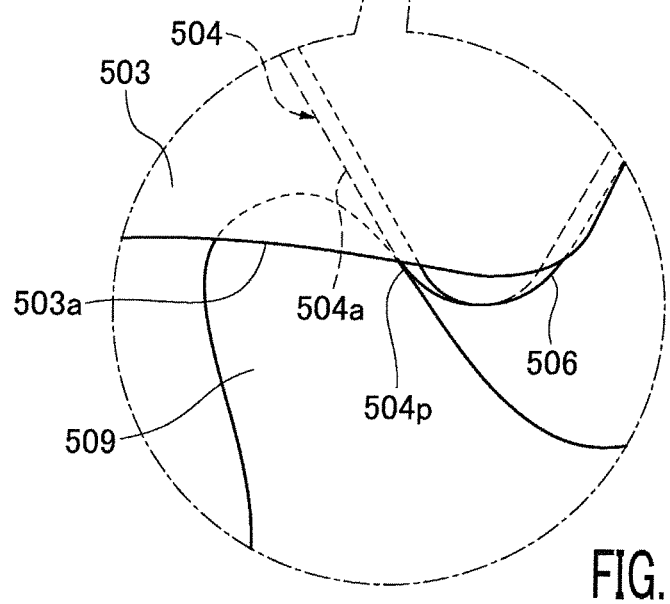
FIG. 9B is an enlarged view of a part of the silent chain transmission shown in FIG. 9A outlined by a broken line circle in FIG. 9A.

Alternatively, as shown in FIG. 8, an intermediate link plate 130 of the guide rows, can a sliding-contact link plate the back surface 141 of which has an arcuate shape in the direction of chain travel and an arc-shaped transverse section in the direction of the width of the chain. The inner link plates 150, and optionally one or more of the other intermediate link plates 130 can be configured to avoid the contact with the sliding contact surface of a guide.

With the arrangements shown in FIGS. 7 and 8, the use of non-sliding-contact link plates makes it possible to reduce the contact area between the chain and the sliding contact surface of a chain guide with a resulting reduction in frictional loss.

Although the invention is described with reference to a driving sprocket wherein contact between a sprocket tooth and a guide plate before the start of engagement with a link plate tooth is avoided, advantages of the invention can be realized by configuring the chain so that a similar effect is realized at the engagement of the chain with a driven sprocket. Here, if the sprocket is a driven sprocket, the engagement starting points P3 and P5 are located on the rear inner flanks 145 and 165.

The silent chain may be of a type other than the inner-flank-engaging and outer-flank-seating type chain, such as an outer-flank-engaging and outer-flank-seating type chain or an inner-flank-engaging and inner-flank-seating type chain.

Advantages of the invention can be realized both in an endless silent chain, or in a reciprocating silent chain not formed into an endless loop.

What is claimed is:

1. A silent chain elongated along a direction of chain travel, the chain comprising:

guide rows each composed of a pair of guide plates in opposed relationship, said guide plates being spaced from each other in a direction perpendicular to the direction of chain travel, each of said guide plates having a guide plate edge defining a profile when viewed in said perpendicular direction, and a plurality of intermediate link plates disposed between the guide plates;

non-guide rows each composed of a plurality of inner link plates, the intermediate link plates of each guide row being interleaved with inner link plates of two adjacent non-guide rows; and two spaced connecting pins connected to the guide plates of each said pair of guide plates, each of said connecting pins articulably connecting a guide row with a non-guide row whereby the guide rows and non-guide rows are disposed in alternating relationship forming a chain;

wherein each of said intermediate link plates and said inner link plates is formed with teeth, the teeth of each of said link plates extend in a direction for engagement with the teeth of a sprocket, and the link plates are rotatable about center lines of the connecting pins;

wherein the guide plates of each guide row are positioned in relation to the intermediate link plates of the same guide row so that the distances from the edges of the guide plates of each guide row to the center of a sprocket engaged by the teeth of the intermediate link plates of the last-mentioned guide row is greater than the distances from the tips of the teeth of said intermediate link plates of the last mentioned guide row to the center of said sprocket by an amount that provides a clearance sufficiently large that engagement between a sprocket tooth and an inner flank of at least one of said teeth of the intermediate link plates of each said guide row takes place before engagement of the last mentioned sprocket tooth with a guide plate in the same same guide row can take place even when the silent chain moves laterally;

wherein the tensile hardness of the guide plates is sufficiently low in relation to the bending rigidity of the connecting pins to prevent substantial warping of the guide plates as a result of tension acting on the chain; and wherein the back surface of each guide plate is configured to avoid contact with a sliding contact surface of a chain guide on which a back surface of a link plate of said chain can slide.

2. The silent chain according to claim 1, wherein the back surface of each of the guide plates has a pair of spaced portions connected by a concave portion, the spaced portions having a back surface height greater than the back surface height of said concave portion, and wherein the back surface heights of said spaced portions are lower than the back surface heights of the intermediate link plates between said guide plates and lower than the back surface height of said inner link plates of the non-guide rows.

3. The silent chain according to claim 1, wherein the back surfaces of the link plates have a convex arcuate shape along the direction of travel of the chain.

4. The silent chain according to claim 1, wherein at least some of said link plates have back surfaces with convex arcuate shapes in section planes transverse to the direction of travel of the chain.

5. The silent chain according to claim 1, wherein, in at least one set of the rows from a set consisting of the guide rows or the chain and a set consisting of the non-guide rows of the chain, at least one link plate has a back surface configured to avoid contact with a sliding-contact surface when said sliding contact surface is in sliding contact with backs of other link plates in the same row.

* * * * *